April 16, 1957 L. T. WHEELOCK 2,788,663
ELECTRONIC VERIFIER
Filed May 17, 1954
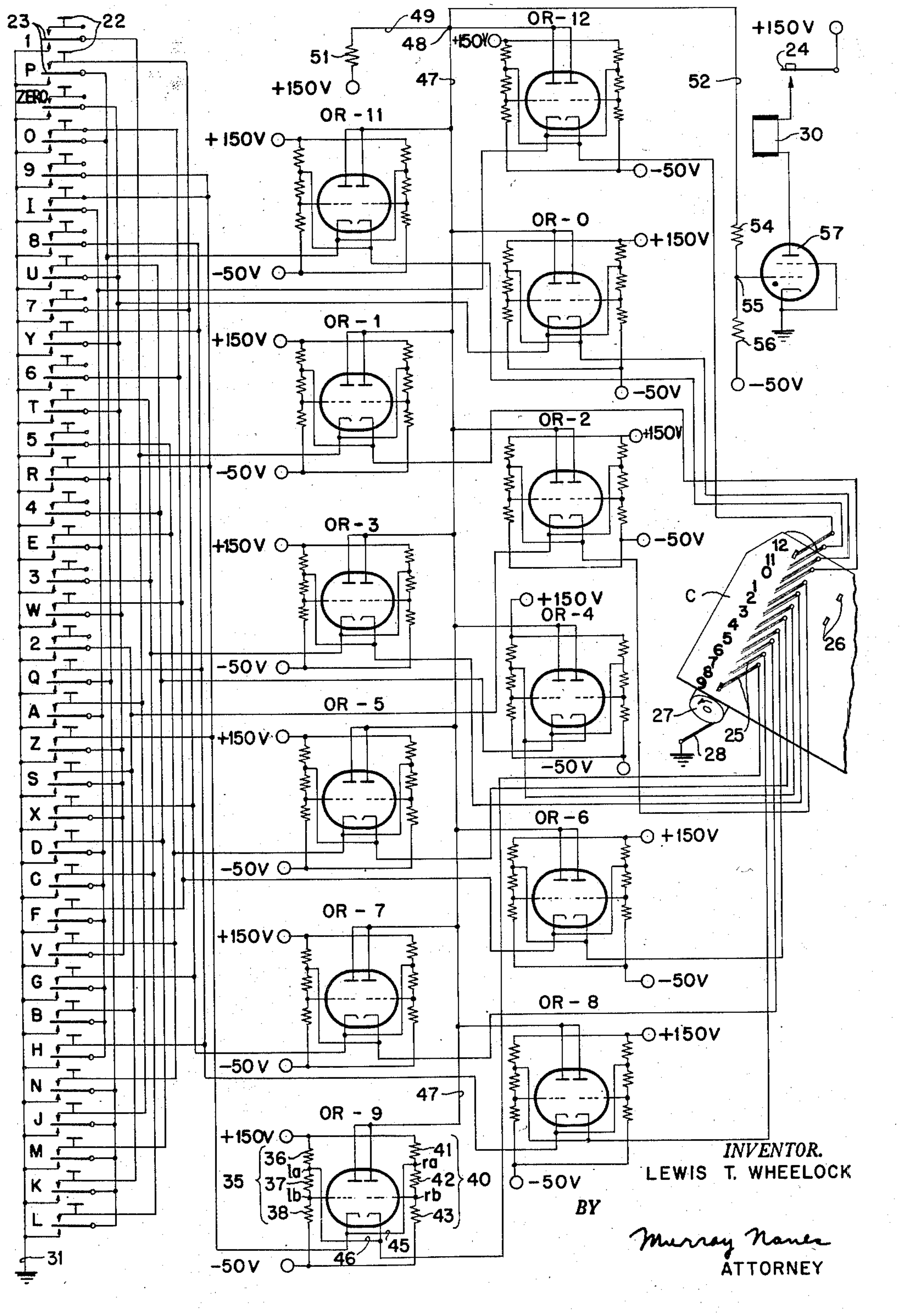
INVENTOR.
LEWIS T. WHEELOCK
BY
Murray Nanes
ATTORNEY

United States Patent Office 2,788,663
Patented Apr. 16, 1957

2,788,663

ELECTRONIC VERIFIER

Lewis T. Wheelock, Manhattan Beach, Calif., assignor to International Business Machines Corporation, New York, N. Y., a corporation of New York Application May 17, 1954, Serial No. 430,380

10 Claims. (Cl. 73—156)

This invention relates to improvements in machines for verifying perforated record cards and in particular to machines in which a record is verified in a step-by-step manner, a column at a time, by means of a keyboard or the like, such that when the hole or the holes in a column of a card being verified differ from the set-up effected by the keyboard, warning is given to the operator, as for instance, by the failure of the machine to rack the card to the next column.

When using purely mechanical or electro-mechanical means, the maximum speed of verification may be limited by the time taken by the machine to complete a verifying operation, and not by the speed of the operator. It is an object of the present invention to provide an improved form of electronic device for detecting errors in perforated record cards, in which the operating speed is considerably increased, so that the machine speed is not the limiting factor. These errors may consist of holes punched in the wrong position, omitted altogether, or punched in addition to the correct hole or holes.

Another object of the invention is to provide, in a verifier, an electronic circuit which renders a card escapement mechanism inoperable when the information represented by the perforations in the column of a record card differs from the information represented by the manual key depressed by the verifier operator.

Still another object of the invention is to provide "exclusive OR" circuits electrically connected in such a manner that the conduction of any electronic valve in the "exclusive OR" circuit will indicate a verification error.

A further object of the invention is to provide a means for testing the condition of the "exclusive OR" circuits.

A still further object of the invention is to provide a means for disabling the escapement mechanism under control of the testing means.

Yet another object is to provide a circuit comprising two voltage divider networks and two triodes interconnected in such a manner so as to function as an "exclusive OR" circuit.

Other objects of the invention will be pointed out in the following description and claims and illustrated in the accompanying drawings, which disclose, by way of example, the principle of the invention and the best mode, which has been contemplated, of applying that principle.

In the drawings:

The single figure of the drawing is a circuit diagram of an embodiment of the invention.

The general arrangements of a verifying machine which utilizes this invention as a part thereof is similar to that shown in the patent to O. B. Shafer 2,315,741, granted April 6, 1943, and comprises a card feeding and sensing unit and a separate alphabetic keyboard arrangement. The keyboard is represented only diagrammatically in the circuit diagram of Fig. 1 by keys 22, which, when depressed, close key contacts 23, there being a double contact for each alphabetic key and a single contact for each numerical key. The structural arrangement of the keyboard is the same as shown in Fig. 12 of the patent referred to, wherein, there is also provided the usual bail contacts 24 which close after each selected set of character representing key contacts 23, and open before key contacts 23 again break. The feeding unit contemplated is one described in the patent to E. W. Gardinor 2,547,456, granted April 3, 1951. In this device, the well known IBM type record cards to be verified are fed singly, step-by-step, so as to present the columns of the record card C in succession to a row of card perforation sensing brushes 25 which are shown in the drawings of the present invention. Twelve of these brushes are provided in position side by side, there being one for each of the usual twelve rows of index point positions of the card. The brushes 25 make contact through the perforations 26 to a common conductive roller 27 which is connected to ground via a common brush 28. When the card is in position above the sensing brushes 25, further advance is controlled by an escapement mechanism which in turn is responsive to the energization of an escape magnet 30. The escapement mechanism is the same as that shown in Fig. 6 of the patent to Shafer 2,315,741 and described in that patent. It need only be understood for the purpose of describing this invention that for each energization of the escape magnet 30, the card is advanced one step, each step of the advancement being coextensive with the columnar spacing of the columns of the card.

A digit is recorded on the card C by perforating it on the corresponding digital index point and an alphabetic character is recorded by perforating the card at one of the index points one to nine, as well as at one of the so-called "zone" positions 0, 11 and 12. A number of "exclusive OR" circuits (to be described hereinafter) are shown in the drawing and each is identified by the letters OR. The number following the OR represents the index point brush 25 to which the right hand cathode of the "exclusive OR" circuit is connected. Thus, the zone position 12 is connected to the right hand cathode of the OR–12 "exclusive OR" circuit and the index point position 9 is connected to the right hand cathode of the OR–9 "exclusive OR" circuit, etc.

The complete coding arrangement for the alphabet is as given in the following table, where the numerals following the letter indicate the index point positions that are perforated to represent that letter.

| | | | |
|---|---|---|---|
| A | 12–1 | N | 11–5 |
| B | 12–2 | O | 11–6 |
| C | 12–3 | P | 11–7 |
| D | 12–4 | Q | 11–8 |
| E | 12–5 | R | 11–9 |
| F | 12–6 | S | 0–2 |
| G | 12–7 | T | 0–3 |
| H | 12–8 | U | 0–4 |
| I | 12–9 | V | 0–5 |
| J | 11–1 | W | 0–6 |
| K | 11–2 | X | 0–7 |
| L | 11–3 | Y | 0–8 |
| M | 11–4 | Z | 0–9 |

As shown in the drawing, the lower blade of the contacts 23 for each key 22 is connected to a common conductor 31 which is connected to ground. The middle blades for the contacts 23 of the alphabetic keys are connected to the left hand cathode of one of the "exclusive OR" circuits OR–0, OR–11 or OR–12 according to the coding arrangement. The upper blades for each contact 23 are connected to the left hand cathodes of one of the "exclusive OR" circuits OR–1 to OR–9. The middle blades for the contacts 23 of the numerical keys are connected to left hand cathodes of the corresponding numbered "exclusive OR" circuits OR–1 to OR–9, and no connection is made to the upper blades of each contact of the numerical keys.

An "exclusive OR" circuit is one in which either one of two input voltages produces an output voltage; but there is no output voltage where there are no input voltages or both input voltages act simultaneously.

The "exclusive OR" OR–9 is shown as comprising two triodes which may be included in one envelope, such as, for example, a type 6SN7 vacuum tube. While vacuum tubes have been shown, it is obvious that any one skilled in the art may replace a vacuum tube "exclusive OR" circuit by one using other types of electronic valves (such as transistors). All the plates of the triodes are commonly connected. A source of +150 volts is connected through a left hand voltage divider circuit 35 comprising three 200K ohm resistors 36, 37 and 38 in series, to a source of −50 volts. The source of +150 volts is also connected through a right hand voltage divider circuit 40 comprising three 200K ohm resistors 41, 42, and 43, in series, to the source of −50 volts. The grid of the left hand triode is connected to the junction *lb* between resistors 37 and 38, and the right hand grid is connected to the junction *rb* between resistors 42 and 43. The cathode of the left hand triode is cross connected via a lead 45 to the junction *ra* between resistors 41 and 42, and the right hand cathode is cross connected via lead 46 to the junction *la* between resistors 36 and 37. The commonly connected plates of OR–9 are connected via a lead 47, a terminal 48, a lead 49 and a 20K ohm resistor 51 to the source of +150 volts. As previously described, the left hand cathode of the OR–9 circuit is connected to key contacts 23, which when closed by the verifier operator, will ground that cathode. The right hand cathode is connected to a brush 25, which when it senses a perforation 26 in a record card C, will ground that cathode.

It is obvious that when the key contacts 23 are open and there are no perforations under the brushes 25, the right and left hand cathodes of OR–9 will be at the potential of junctions *la* and *ra* respectively. The difference in potential between the −50 volt source and the +150 volt source is 200 volts and since there are three equal resistors in the voltage divider circuits, the potential at junctions *lb* and *rb* and each grid is $(-50+{}^{200}\!/\!_{3}=+16\tfrac{2}{3})$ approximately +17 volts, while the potential at junctions *la* and *ra* and each cathode is $(+150-{}^{200}\!/\!_{3}=+83\tfrac{1}{3})$ approximately +83 volts. Thus, the grids will be negative with respect to the cathodes by approximately $(83-17=66)$ 66 volts and the tubes will not conduct.

Assuming now that there is a 9 index row perforation under the brush 25, the right hand cathode will be connected to ground through the roller 27. With the key contact 23 open, the right hand voltage divider 40 is not affected and the right hand grid voltage will remain at +17 volts. The grid of the right hand triode is therefore positive with respect to the cathode and the right hand triode will conduct. Since the right hand cathode is at ground, the junction *la* will be at ground and because there are two equal resistors between junction *la* and the −50 source, the potential at junction *lb* will be $(0-{}^{50}\!/\!_{2}=-25)$ −25 volts. Thus, the left hand grid will be negative with respect to the cathode by −25 volts and this is enough to prevent the left hand triode from conducting. When the corresponding key contacts 23 which are connected to the cathode of the left hand triode are closed, the left hand triode junction *ra* will be at ground potential. With junction *ra* at ground potential, junction *rb* and the right hand grid will go to −25 volts. Thus, both grids will be at a potential of −25 volts with respect to their cathodes and neither triode will conduct.

It is obvious that if the key contacts 23 are closed and the corresponding brush 25 does not sense a perforation 26, then the left hand triode will conduct. Summarizing, if both the brush 25 and its corresponding key contacts 23 complete circuits to their respective cathodes, neither triode will conduct. If either circuit is completed without its corresponding circuit, indicating a failure to compare, one of the triodes will conduct.

It can be observed that the commonly connected plates of all the "exclusive OR" circuits are connected to lead 47. When none of the triodes of the "exclusive OR" circuits are conducting, the plate potential and therefore the potential at lead 47 and terminal 48 will equal +150 volts, because there is no voltage drop across the 20K ohm resistor 51. Terminal 48 is connected via a lead 52, a 200K ohm resistor 53, a terminal junction 55, and a 100K ohm resistor 56 to the source of −50 volts. The resistor 53 and 55 form a divider network and the junction 55 is connected to the control grid of a thyratron 57. The cathode and second grid of the thyratron 57 are commonly connected to ground, while the plate is connected via the escape magnet 30 and the bail contacts 24 to the source of +150 volts. Thyratron 57 is a gas filled tetrode, which can be controlled to fire, by applying a high enough positive potential to the control grid to reach the ionization point. Once the thyratron is fired, the conduction can be stopped only by opening the plate or cathode circuits, i. e., the control grid loses all control after firing.

When terminal 48 goes to +150 volts, the difference in potential across the voltage divider 53 is 200 volts and since resistor 56 has one third the resistance of the voltage divider 53, the potential at junction 55 and the control grid of the thyratron 57 is $(-50+{}^{200}\!/\!_{3}=+16\tfrac{2}{3})$ approximately +17 volts. To test the condition of the "exclusive OR" circuits, bail contacts 24 close to complete the plate circuit of the thyratron 57. With the control grid at +17 volts because none of the triodes are conducting, the thyratron 57 will conduct and escape magnet 30 is energized, causing a one column escapement of the record card C, as previously indicated.

If any triode of the "exclusive OR" circuits is conducting due to a failure to compare, a 100 volt drop will occur across plate resistor 51, and the plate potential and the voltage at terminal 48 will fall to +50 volts. The difference in potential across the voltage divider 53 is then 100 volts, and the potential at junction 55 and the control grid of the thyratron 57 is $$(-50+{}^{100}\!/\!_{3}=-16\tfrac{2}{3})$$

approximately −17 volts. When the bail contacts 24 close to complete the thyratron plate circuit, the thyratron 57 will fail to fire because of the −17 volts on its control grid. Therefore, no escapement of the record card C will occur. In this case, an error light can be made to light in a well known manner, to indicate to the verifier operator that there is an error in the card, or that the operator has operated the wrong key. The operator can then recheck the column and if an error is again indicated, a released mechanism may be operated, as described in the Shafer Patent 2,315,741, to remove the card from the machine.

From the above description, to summarize, it is seen that the function of the verifier is to cause energization of the escape magnet 30 when the information represented by perforations in the card is the same as that in the key which the operator depresses. When the two bits of information do not compare, then the escape magnet remains deenergized and the record card is not fed to the next column.

While there have been shown and described and pointed out the fundamental features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A machine for verifying perforations at a plurality of index positions in different columns of a record card comprising in combination, an escapement mechanism operable when energized to advance the card from one column to the next, an exclusive OR circuit including a pair of electronic valves for each index position of said card, each pair of electronic valves being conductive only if one or the other, but not both of the valves are pulsed, sensing means electrically connected to the exclusive OR circuits and controlled by perforations in said card for pulsing one valve of each said pair of valves to initially render the valves corresponding to the perforated index positions conductive, manually operable keys, key contacts operated by said keys and connected to corresponding index position exclusive OR circuits, said key contacts adapted to pulse the other valve of each pair of valves to render all the valves corresponding to the index positions of the key contacts operated non-conductive if initially conductive, said last mentioned means rendering all the valves corresponding to the index positions of the key contacts operated conductive if initially non-conductive, a set of bail contacts operated by each of said keys after said key contacts are operated, means including said set of bail contacts to energize said escapement mechanism when conditioned, and means for connecting the exclusive OR circuits to a common output circuit through which said valve current flows, said common output circuit coupled to said energizing means and adapted to condition said energizing means except if any of said valves remain conductive.

2. The machine of claim 1 including a source of positive potential, said energizing means including a gaseous tube, and said escapement mechanism including an escape magnet, said gaseous tube series connected via said escape magnet and said bail contacts to said source of positive potential, said gaseous tube conducting to energize said escape magnet when said bail contacts are operated.

3. The machine of claim 2 including a resistor, each of said electronic valves comprising an anode, cathode and grid, the anodes of said electronic valves being commonly connected via said resistor to said source of positive potential, said coupling between said energizing means and said electrical circuit comprising a connection between said commonly connected anodes and the grid of the gaseous tube, said coupling going negative when any valve is conductive to prevent said gaseous tube from conducting.

4. The machine of claim 3 including a source of negative potential said exclusive OR circuits comprising, a pair of voltage divider networks for each pair of electronic valves, said divider networks being connected between said source of positive and negative potentials, the grid of each electronic valve being connected to a predetermined potential point on its corresponding voltage divider network, the cathode of each electronic valve being cross coupled to a second point on the voltage divider of its paired valve, said second point being at a more positive potential than said predetermined point, said sensing means being connected to one cathode of its corresponding pair of valves and said key contact means being connected to the other cathode of its corresponding pair of valves.

5. The machine of claim 1 including a source of positive potential, a resistor, each of said electronic valves comprising an anode, cathode and grid, the anodes of said electronic valves being commonly connected via said resistor to said source of positive potential, said commonly connected anodes going negative when any valve is conductive to render said energizing means inoperable.

6. The machine of claim 5 including a source of negative potential, said exclusive OR circuits comprising a pair of voltage divider networks for each pair of electronic valves, said divider networks being connected between said source of positive and negative potentials, the grid of each electronic valve being connected to a predetermined potential point on its corresponding voltage divider network, the cathode of each electronic valve being cross coupled to a second point on the voltage divider of its paired valve, said second point being at a more positive potential than said predetermined point, said sensing means being connected to one cathode of its corresponding pair of valves and said key contact means being connected to the other cathode of its corresponding pair of valves.

7. A machine for verifying perforations at a plurality of index positions in different columns of a record card comprising in combination, an escapement mechanism operable when energized to advance the card from one column to the next, an exclusive OR circuit including a pair of electronic valves for each index position of said card, each pair of electronic valves being conductive only if one or the other, but not both of the valves are pulsed, sensing means electrically connected to the exclusive OR circuits and controlled by perforations in said card for pulsing one valve of each said pair of valves to initially render the valves corresponding to the perforated index positions conductive, manually operable keys, key contacts operated by said keys and connected to corresponding index position exclusive OR circuits, said key contacts adapted to pulse the other valve of each pair of valves to render all the valves corresponding to the index positions of the key contacts operated non-conductive if initially conductive, said last mentioned means rendering all the valves corresponding to the index positions of the key contacts operated conductive if initially non-conductive, test means for determining if any valves remain conductive, means including said test means for energizing said escapement mechanism when conditioned, and a common output circuit connected to the exclusive OR circuits and through which said valves current flows, said common output circuits coupled to said energizing means and adapted to condition said energizing means except if any of said valves remain conductive.

8. The machine of claim 7 including a source of positive potential, a resistor, each of said electronic valves comprising an anode, cathode and grid, the anodes of said electronic valves being commonly connected via said resistor to said source of positive potential, said commonly connected anodes going negative when any valve is conductive to render said energizing means inoperable.

9. The machine of claim 8 including a source of negative potential, said exclusive OR circuits including a pair of voltage divider networks for each pair of electronic valves, said divider networks being connected between said sources of positive and negative potentials, the grid of each electronic valve being connected to a predetermined potential point on its corresponding voltage divider network, the cathode of each electronic valve being cross coupled to a second point on the voltage divider of its paired valve, said second point being at a more positive potential than said predetermined point, said sensing means being connected to one cathode of its corresponding pair of valves and said key contact means being connected to the other cathode of its corresponding pair of valves.

10. A machine for verifying perforations at a plurality of index positions in different columns of a record card comprising in combination, an escapement mechanism including an escape magnet operable when energized to advance the card from one column to the next, a pair of electronic valves for each index position of said card, a source of positive and negative potential, a pair of voltage divider networks for each pair of electronic valves, said divider networks being connected between said sources of positive and negative potentials, the grid of each electronic valve being connected to a predetermined potential point on its corresponding voltage divider, the cathode of each electronic valve being cross coupled to a more positive potential point than the grid on the voltage divider network of its paired valve, sensing means connected to one cathode of each pair of valves, said connections controlled by perforations in said card and serving to initially render the valves corresponding to the index position of the perforations conductive, manually operable keys, key contacts for each index position and operated by said keys, said key contacts connected to the other cathode of each pair of valves, a set of bail contacts operated by each of said keys after said key contacts are operated, and means to energize said escape magnet under control of said set of bail contacts, said energizing means including a gaseous tube series connected via said escape magnet and said bail contacts to said source of positive potential, said gaseous tube conducting when said bail contacts are operated, and a resistor, the anodes of said electronic valves being commonly connected via said resistor to said source of positive potential, said commonly connected anodes being connected to the grid of the gaseous tube and going negative when any valve is conductive to prevent said gaseous tube from conducting.

References Cited in the file of this patent

UNITED STATES PATENTS 2,043,280 Bryce ------------------ June 9, 1936